United States Patent [19]

Schwarz et al.

[11] Patent Number: 4,591,962
[45] Date of Patent: May 27, 1986

[54] REGULATED POWER SUPPLY FOR RAPID NO-LOAD TO FULL-LOAD TRANSITIONS

[75] Inventors: Albrecht Schwarz, North Caldwell; John D. Sosnowski, Roselle Park, both of N.J.

[73] Assignee: International Telephone and Telegraph Corporation, New York, N.Y.

[21] Appl. No.: 562,143

[22] Filed: Dec. 16, 1983

[51] Int. Cl.[4] .............................................. H02M 3/22
[52] U.S. Cl. ......................................... 363/15; 363/79
[58] Field of Search .................. 328/258, 267; 363/15, 363/16, 17, 21, 25, 26, 37, 79, 80, 97

[56] References Cited

U.S. PATENT DOCUMENTS 4,274,132  6/1981  Molyneux-Berry ................... 363/21

FOREIGN PATENT DOCUMENTS 2635089  2/1978  Fed. Rep. of Germany ........ 363/21
0062076  5/1981  Japan ..................................... 363/25

Primary Examiner—William H. Beha, Jr.
Assistant Examiner—Jeffrey Sterrett
Attorney, Agent, or Firm—John T. O'Halloran; Robert P. Seitter

[57] ABSTRACT

The power supply converts alternating current voltage to a direct current voltage which is in turn converted to a pulse width modulated voltage. A circuit arrangement is provided responsive to the pulse width modulated voltage to produce N output direct current voltages each having a different predetermined value, where N is an integer greater than one. A feedback circuit is provided between the circuit arrangement and the circuit providing the pulse width modulated voltage to provide a substantially constant value for the N output voltages when a varying load is presented to the power supply. A current transformer arrangement is coupled in series in the feedback circuit to provide wide bandwidth and low droop without oscillation for the power supply when the power supply is subjected to a step load (a step from no-load up to full-load).

46 Claims, 2 Drawing Figures

REGULATED POWER SUPPLY FOR RAPID NO-LOAD TO FULL-LOAD TRANSITIONS

BACKGROUND OF THE INVENTION

The present invention relates to a power supply for electronic equipment and more particularly to a proportional pulse current feedback power supply.

In the prior aft power supplies, upon application of prime power, high voltage is developed after sufficient filament warm up time across a plurality of capacitors. Feedback from the most negative one of the voltages maintains these voltages, establishing a regulated power supply. When a power supply is employed in conjunction with a traveling wave tube, and radio frequency (RF) transmission is not required, the traveling wave tube draws no current from the power supply. However, when RF transmission is required, the traveling wave tube demands full load from the power supply. This is a no-load to full-load step-load on the power supply. Its response to this is dependent upon a number of factors.

The traveling wave tube requirement for a step load is that the droop or pulse regulation of the helix and first and second collectors be held within a few percent (typically less than 5%) of the nominal voltage.

A number of approaches to meet this requirement have been tried in the past, in many cases with partial success. A brief review follows.

(A) The droop or pulse regulation can be minimized by increasing the total capacitance of the capacitors providing the voltage sufficient to hold the charge until the regulator response is stabilized.

(B) An alternate method would be to increase the bandwidth and slew rate to maintain the regulation.

(C) An additional scheme is to provide an anticipation signal into the feedback circuit that commands increased output power before a substantial droop results. This approach is called "feed forward" in the art.

Although combinations of the above approaches have been used, the results are not always satisfactory. With approach (A) the resultant size of the capacitors makes the power supply prohibitively large especially for airborne applications. With approach (B) the bandwidth cannot be achieved due to the component limitations to meet the pulse regulation, since the inherent switching noise interferes with performance. Approach (C) has been successfully used, but for limited conditions; It will frequently result in considerable overshoot and ringing.

SUMMARY OF THE INVENTION

An object of the present invention is to provide a fourth approach to meet the droop or pulse regulation requirements of a high voltage power supply for a step load.

Another object of the present invention is to provide a high voltage power supply which overcomes the disadvantages of the three prior art approaches mentioned herein above.

A feature of the present invention is the provision of a power supply for electronic equipment comprising: first means to convert an alternating current voltage input to a direct current voltage; second means coupled to the first means to convert the direct current voltage to a pulse width modulated voltage; third means coupled to the second means responsive to the pulse width modulated voltage to produce N output direct current voltages, each having a different predetermined value, where N is an integer greater than one; feedback means coupled between the third means and the second means to provide a substantially constant value for the N output voltages when a varying line voltage and load is presented to the power supply; and current transformer means coupled in series in the feedback means to provide wide bandwidth and low droop without oscillation when a step load is presented to the power supply.

The introduction of the current transformer in series with the high voltage capacitors (actually between the cathode and the junction of the three high voltage capacitors) results in a considerably lower droop due to a step load without any of the disadvantages of the three prior art approaches.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENTS

The embodiments disclosed herein will be described with respect to providing high voltages for a traveling wave tube. It should be noted, however, that the power supply of the instant application is not limited to use with a traveling wave tube but the principles thereof may be employed in providing high voltage power for other electronic equipment or to provide low voltages for electronic equipment requiring regulated low voltage for the operation thereof.

Figure 1:
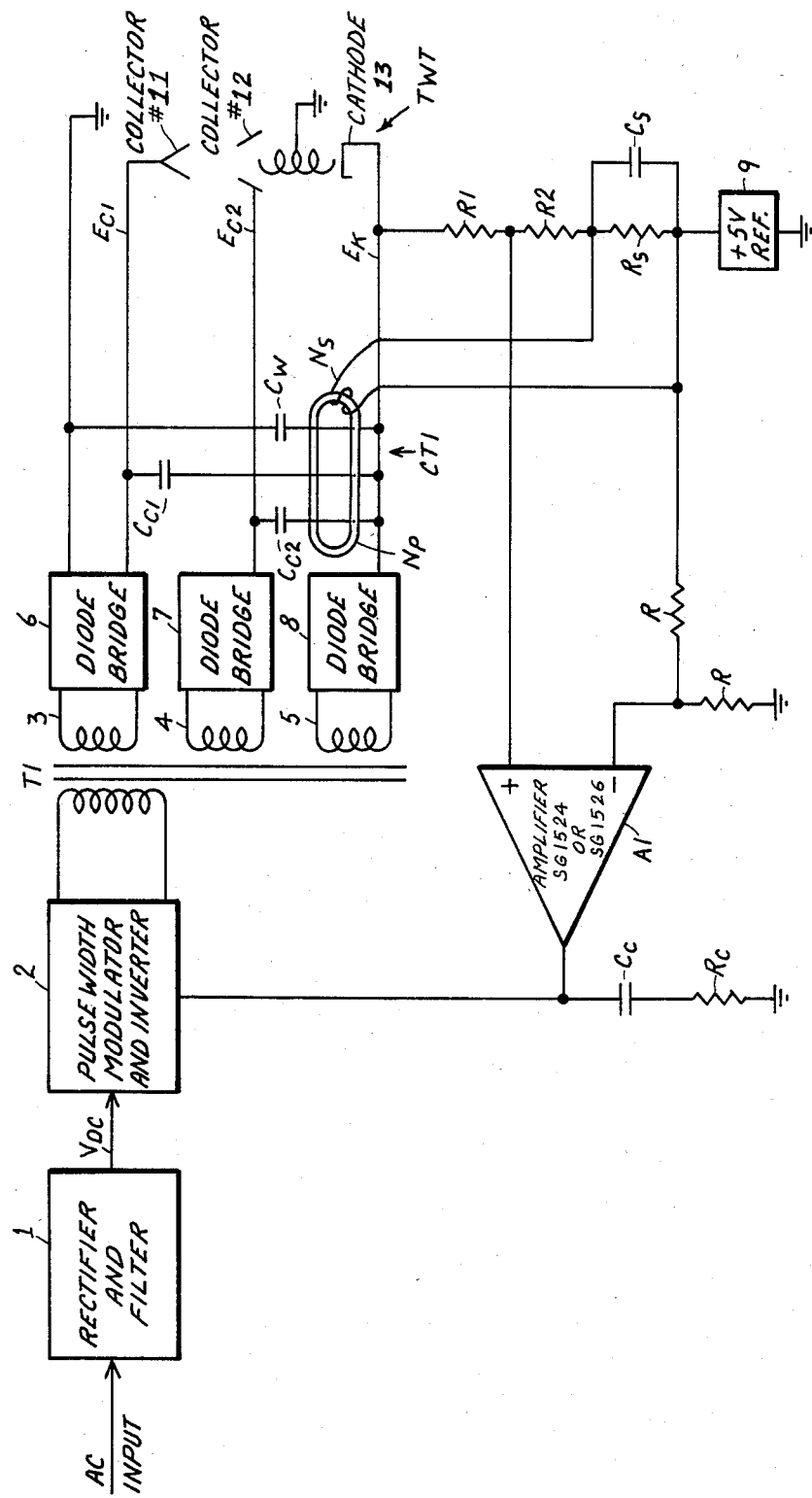
FIG. 1 is a block diagram illustrating a first embodiment of the power supply in accordance with the principles of the present invention.

Referring to FIG. 1, the high voltage power supply of the present application includes a rectifier and filter 1 which converts an alternating current voltage to a direct current voltage. The output of the rectifier and filter 1 is coupled to a pulse width modulator and inverter 2. The rectifier and filter 1 and the pulse width modulator and inverter 2 are well known circuit arrangements in the prior art that have been employed in prior art power supplies.

The output of modulator and inverter 2 is coupled to a transformer T1 whose three secondary windings 3–5 are coupled to different diode bridges 6–8. The outputs of the diode bridges 6–8 are coupled as indicated to capacitors $C_{C1}$, $C_{C2}$ and $C_W$ to provide the voltages $E_{C1}$ for collector 11, $E_{C2}$ for a collector 12 and $E_K$ for a cathode 13. There are three high voltages developed across capacitors $C_W$, $C_{C1}$ and $C_{C2}$ after sufficient filament warm up time. Feedback from the cathode 13 of the traveling wave tube, which is negative with a right turn helix, is via resistors R1 and R2 forming a voltage divider between the cathode 13 of the traveling wave tube and a reference voltage source 9. The positive input of amplifier A1 is coupled to the junction of resistors R1 and R2 with the output thereof being coupled to pulse width modulator and inverter 2 to maintain the voltages at capacitors $C_{C1}$, $C_{C2}$ and $C_W$ substantially constant thereby providing a regulated high voltage power supply. Amplifier A1 is a transconductance type amplifier and may be a SG 1524 amplifier obtainable from Signetics or Silicon General or a SG 1526 amplifier obtainable from Silicon General. However, any suitable amplifier may be used.

When there is no requirement for RF transmission, the traveling wave tube draws no current from the power supply. However, when RF transmission is required, the traveling wave tube demands full-load or full power from the high voltage power supply. This is a no-load to full-load step-load on the power supply. The power supply response to this is dependent on a number of factors as pointed out herein above.

Current transformer CT1 is coupled in series with the high voltage capacitors $C_{C1}$, $C_{C2}$ and $C_W$ (actually between the cathode 13 of the traveling wave tube and the junction of these three high voltage capacitors). Incorporation of the current transformer CT1 (the main feature of this invention) results in a considerably lower droop due to a step load without any of the disadvantages indicated hereinabove under the heading "Background of the Invention".

As shown in FIG. 1 the current transformer CT1 is inductively coupled to the three high voltage capacitors by the primary winding $N_p$ with its secondary winding $N_s$ and resistor $R_s$ being disposed in series with the feedback resistors R1 and R2. However, secondary winding $N_s$ and resistor $R_s$ can be inserted any place in the feedback path that is convenient. One place, not shown, is at the output of amplifier A1. However, additional circuitry would be required for isolation and scaling. It has been established that it is more convenient to provide secondary winding $N_s$ and resistor $R_s$ including the capacitor $C_s$, which is used for noise decoupling only, in series with the voltage divider of R1 and R2.

The introduction of current transformer CT1 as shown in FIG. 1 results in the interaction of voltage and current feedback paths to provide a wide bandwidth, fast slew rate (low droop due to the traveling wave tube step load) and yet non-oscillatory high voltage power supply. This achievement of bandwidth, slew rate and non-oscillatory condition with the addition of a simple current transformer to provide proportional "pulse current feedback" will be referred to as PIFB and explained with the use of a partial block diagram as illustrated in FIG. 2.

Figure 2:
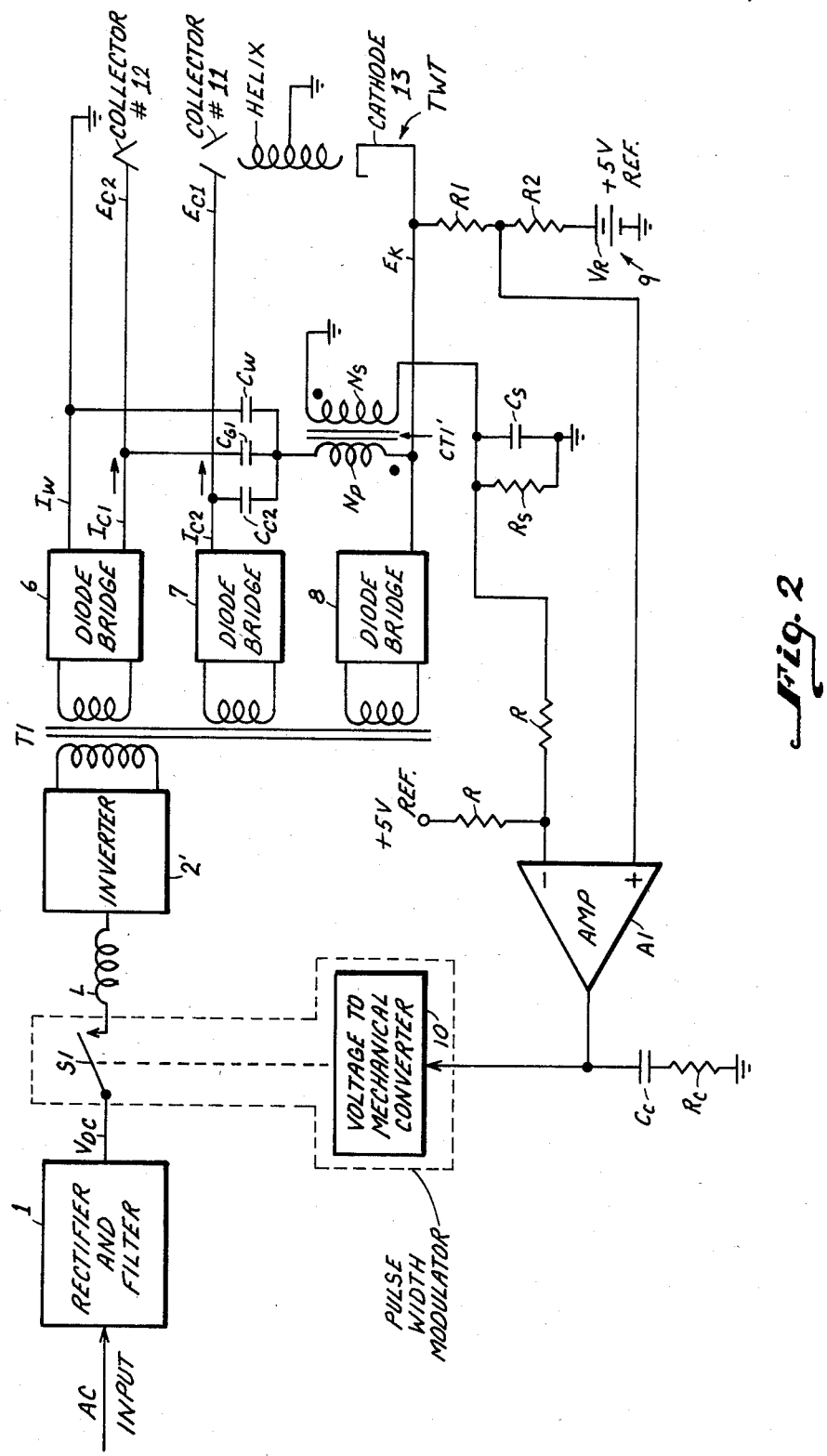
FIG. 2 is a block diagram of a second embodiment of the high voltage power supply in accordance with the principles of the present invention.

FIG. 2 shows the implementation of an PIFB approach which is substantially the same as the circuitry of FIG. 1 with a different connection of the current transformer CT1' and the location of the scaling resistor Rs.

Except for the current transformer CT1', the configuration of the circuitry is a conventional switching regulator providing static regulation. In the literature this is referred to as a switch mode power supply (SMPS).

Briefly, the output of the rectifier and filter 1, $V_{DC}$, the rectified AC voltage, is converted to regulated output voltages $E_K$, $E_{C1}$ and $E_{C2}$ by varying the ratio of the ON to OFF time of switch S1 via means of the voltage to mechanical converter 10 forming part of the pulse width modulator and inverter 2 of FIG. 1. The choke L, the inverter 2 and the transformer T1 associated with the high voltage diode bridges 6–8 serve only to scale and smooth the resultant voltages appropriately. To provide the static regulation, the feedback resistors R1 and R2, amplifier A1 and the reference voltage $V_R$ interact to change the ON to OFF ratio of switch S1.

Dynamic regulation is required when the traveling wave tube is pulsed on. At this time, currents $I_W$, $I_{C1}$ and $I_{C2}$ flow in the helix, collector 11 and collector 12. Initially, before the power supply can respond, due to slew rate and bandwidth limitations, all the current is supplied by capacitors $C_W$, $C_{C1}$ and $C_{C2}$, respectively. These capacitors will discharge (droop) excessively unless the power supply is made to respond quickly. The response of the power supply is limited by the compensation network resistor $R_c$ and capacitor $C_c$ and amplifier A1. These components must be sized to prevent oscillation by compensating the effect of the double pole generated by L and the reflected $C_{c1}$, $C_{c2}$ and $C_w$. If capacitor $C_c$ can be made small enough, the use of the PIFB approach would not be necessary. However, as capacitor $C_c$ is decreased, oscillation and noise results.

The PIFB approach allows the use of $R_c \cdot C_c$ products without oscillation or excessive noise because of various feedback interactions.

The following is a summary of these interactions.

(A) At very low frequencies or DC, below the level at which current transformer CT1' is effective, the net loop gain $G_{DC}$ equals the sum of the elements in FIG. 2. Thus, in db (decibel) $G_{DC} \approx A1 + G_m + R_2/R_1$. For the high voltage power supply, R2 is much less than R1, $G_m$ is the power supply modulator gain and includes constants due to switch S1 and transformer T1. This is similar to other SMPS arrangements.

(B) At frequencies where CT1' is effective, the loop transfer function is modified primarily by the addition of a phase lead that is generated by the series connection of current transformer $C_{T1}$ with capacitors $C_{c1}$, $C_{c2}$ and $C_w$. This phase lead approximately cancels 90° of the 180° that results from the interaction of the inductor L and the capacitors $C_W$, $C_{C1}$ and $C_{C2}$. As a result of the 90° phase lead, the capacitance of capacitor $C_c$ can be decreased sufficiently to enable maximum slew rate performance from amplifier A1.

(C) The above descriptions are part of the steady state solution of the dynamics describing the performance of the power supply of FIG. 2 which is substantially the same as that of FIG. 1. However, at the instant the traveling wave tube demands current, the transient solution describes the dynamics. During the transient interval, current flows through capacitors $C_W$, $C_{C1}$ and $C_{C2}$. When the current is being drawn from the capacitor by the traveling wave tube, the current transformer CT1' provides a signal which aids the voltage feedback via resistors R1 and R2. However, the signal from the current transformer is much larger than the voltage from resistors R1 and R2 and is the major feedback during the transient condition. The signal or current from the current transformer CT1 is able to drive amplifier A1 full on (since its output drive requirement has been greatly reduced due to a much smaller value of $C_c$) and, thus, the capacitors $C_W$, $C_{C1}$ and $C_{C2}$ are recharged earlier than with just the use of the usual feedback path including resistors R1 and R2. Similarly, if the capacitors $C_W$, $C_{C1}$ and $C_{C2}$ are overcharged, the effect of the current transformer CT1' will be to throttle the pulse width and, therefore, maintain a critically damped performance.

A practical example will highlight the effect of capacitor $C_c$ on the amplifier A1 slew rate.

Without the use of the PIFB concept a typical value for capacitor $C_c$ would be 0.1 $\mu$F for an amplifier that has a 100 $\mu$A capability and its output is required to swing 3 volts when a step load is applied. The time required for this response is about $3 \times 10^{-3}$ seconds.

Due to the use of the PIFB, the value of capacitor $C_c$ can be decreased to 0.01 μF with the same amplifier. The response time is therefore reduced by the same factor to $0.3 \times 10^{-3}$ seconds. Similarly the frequency response is increased by a factor of ten.

It might seem from the above that a different solution that uses a amplifier that can deliver more current, e.g. one milliamp and therefore produces the same slew rate, would provide the same performance. However in that event a resistor would have to be added in series with the amplifier output. The resistor would be necessary to prevent oscillation. The added resistor would bring the frequency response and the slew rate back to the original values, i.e., that obtained before the application of PIFB.

Although the above discussion addresses a high voltage power supply, the teachings of the application are equally applicable to a low voltage power supply. The scaling or turns ratio of the current transformer would of course have to be adjusted to be consistent with the low voltage power supply construction.

In summary, the PIFB approach incorporates a current transformer CT1 or CT1' in series with the load capacitors or output voltage capacitors $C_W$, $C_{C1}$ and $C_{C2}$ which adds a pulse current feedback loop as well as a small signal voltage feedback loop.

The current feedback loop gives the SMPS its large signal slew rate capability.

The voltage feedback due to the current transformer CT1' or CT1 modifies the major feedback loop via resistors R1 and R2. The modified voltage gain not only desensitizes the SMPS from interference from its own switching noise (overcoming objection (B) in the discussion under the heading "Background of the Invention"), but it also allows the decrease of the compensation capacitor $C_c$. The reduced capacitor $C_c$ allows taking full advantage of the amplifier A1 slew rate capability demanded by the pulse current from the current transformer CT1.

Equally important is that the 90° phase lead produced by the series connection of the capacitors $C_W$, $C_{C1}$ and $C_{C2}$ and the current transformer CT1 cancels one of the two poles produced by the inductor L and the reflected load capacitances. This produces a SMPS with an overall 6 db per octave rolloff at the cross-over frequency of the power supply resulting in non-oscillitory operation.

While we have described above the principles of our invention in connection with specific apparatus, it is to be clearly understood that this description is made only by way of example and not as a limitation to the scope of our invention as set forth in the objects thereof and in the accompanying claims.

We claim:

1. A power supply for electronc equipment comprising:
   first means to convert an alternating current voltage input to a direct current voltage;
   second means coupled to said first means to convert said direct current voltage to a pulse width modulated voltage;
   third means coupled to said second means responsive to said pulse width modulated voltage to produce at respective active outputs thereof N output direct current voltages, each having a different predetermined value, where N is an integer greater than one and a ground potential at an additional output thereof, and including N capacitors each connected between a single one of said active outputs and a different remaining output;
   feedback means coupled between said one output of said third means and said second means to provide a substantially constant value for said N output voltages when a varying load is presented to said power supply; and
   current transformer means having an input portion interposed between each of said capacitors and said one active output and an output portion inductively coupled to said input portion and connected in series to said feedback means to provide wide bandwidth and low droop without oscillation for said power supply when a step load is presented to said power supply.

2. A power supply according to claim 1, wherein said first means includes
   a rectifier coupled to said alternating current voltage, and
   a filter coupled to said rectifier to provide said direct current voltage.

3. A power supply according to claim 2, wherein said second means includes
   a pulse width modulator coupled to said filter and said feedback means, and
   an inverter coupled to an output of said pulse width modulator.

4. A power supply according to claim 3, wherein said third means includes
   a transformer having a primary winding coupled to said inverter and N secondary windings, and
   N diode bridges each coupled to a different one of said N secondary windings and having one of said active outputs; and
   wherein each of said N capacitors has one terminal coupled to a common point and one of said N diode bridges and the other terminal connected to appropriate outputs of the others of said N diode bridges to provide said different predetermined values.

5. A power supply according to claim 4, wherein said feedback means includes
   a resistive voltage divider coupled between said common point and a reference voltage, and
   an amplifier means having a negative input, a positive input and an output, said output being coupled to said pulse width modulator and said positive input being coupled to said voltage divider.

6. A power supply according to claim 5, wherein said current transformer means includes
   a current transformer having a primary winding inductively coupled to said N capacitors adjacent said common point and a second winding coupled to said primery winding, and
   a resistor coupled across said secondary winding and disposed between said voltage divider and said reference voltage, the junction between said resistor and said reference potential being coupled to said negative input of said amplifier means.

7. A power supply according to claim 5, wherein said current transformer means includes
   a current transformer having a primary winding coupling said N capacitors to said common point and a secondary winding coupled to said primary winding having one terminal coupled to ground potential and the other terminal coupled to said negative input of said amplifier means, and a resistor coupled between said other terminal and said ground potential.

8. A power supply according to claim 7, wherein said current transformer means further includes a capacitor coupled in parallel with said resistor to provide noise decoupling.

9. A power supply according to claim 5, wherein said amplifier means includes a first capacitor and a first resistor connected in a series relationship between said output of said amplifier means and ground potential.

10. A power supply according to claim 9, wherein said current transformer means includes a current transformer having a primary winding coupling said N capacitors to said common point and a secondary winding coupled to said primary winding having one terminal coupled to ground potential and the other terminal coupled to said negative input of said amplifier means, and a second resistor coupled between said other terminal and said ground potential.

11. A power supply according to claim 10, wherein said current transformer means further includes a second capacitor coupled in parallel with said second resister to provide noise decoupling.

12. A power supply according to claim 9, wherein said current transformer means includes a current transformer having a primary winding inductively coupled to said N capacitors adjacent said common point and a second winding coupled to said primary winding, and a second resistor coupled across said secondary winding and disposed between said voltage divider and said reference voltage, the junction between said second resistor and said reference potential being coupled to said negative input of said amplifier means.

13. A power supply according to claim 12, wherein said current transformer means further includes a second capacitor coupled in parallel with said second resistor to provide noise decoupling.

14. A power supply according to claim 1, wherein said second means includes a pulse width modulator coupled to said first means and said feedback means, and an inverter coupled to an output of said pulse width modulator.

15. A power supply according to claim 14, wherein said third means includes a transformer having a primary winding coupled to said inverter and N secondary windings, and N diode bridges each coupled to a different one of said N secondary windings and having one of said active outputs; and wherein each of said N capacitors has one terminal coupled to a common point and one of said N diode bridges and the other terminal connected to appropriate outputs of the others of said N diode bridges to provide said different predetermined values.

16. A power supply according to claim 15, wherein said feedback means includes a resistive voltage divider coupled between said common point and a reference voltage, and an amplifier means having a negative input, a positive input and an output, said output being coupled to said pulse width modulator and said positive input being coupled to said voltage divider.

17. A power supply according to claim 16, wherein said current transformer means includes a current transformer to said N capacitors adjacent said common point and a second winding coupled to said primary winding, and a resistor coupled across said secondary winding and disposed between said voltage divider and said reference voltage, the junction between said resistor and said reference potential being coupled to said negative input of said amplifier means.

18. A power supply according to claim 17, wherein said current transformer means further including a capacitor coupled in parallel with said resistor to provide noise decoupling.

19. A power supply according to claim 16, wherein said current transformer means includes a current transformer having a primary winding coupling said N capacitors to said common point and a secondary winding coupled to said primary winding having one terminal coupled to ground potential and the other terminal coupled to said negative input of said amplifier means, and a resistor coupled between said other terminal and said ground potential.

20. A power supply according to claim 19, wherein said current transformer means further includes a capacitor coupled in parallel with said resistor to provide noise decoupling.

21. A power supply according to claim 16, wherein said amplifier means includes a first capacitor and a first resistor connected in a series relationship between said output of said amplifier means and ground potential.

22. A power supply according to claim 21, wherein said current transformer means includes a current transformer having a primary winding coupling said N capacitors to said common point and a secondary winding coupled to said primary winding having one terminal coupled to ground potential and the other terminal coupled to said negative input of said amplifier means, and a second resistor coupled between said other terminal and said ground potential.

23. A power supply according to claim 22, wherein said current transformer means further includes a second capacitor coupled in parallel with said second resistor to provide noise decoupling.

24. A power supply according to claim 21, wherein said current transformer means includes a current transformer having a primary winding inductively coupled to said N capacitors adjacent said common point and a second winding coupled to said primary winding, and a second resistor coupled across said secondary winding and disposed between said voltage divider and said reference voltage, the junction between said second resistor and said reference potential being coupled to said negative input of said amplifier means.

25. A power supply according to claim 21, wherein said current transformer means further includes a second capacitor coupled in parallel with said second resistor to provide noise decoupling.

26. A power supply according to claim 1, wherein said third means includes
   a transformer having a primary winding coupled to said second means and N secondary windings, and
   N diode bridges each coupled to a different one of said N secondary windings; and
   wherein each of said N capacitors has one terminal coupled to a common point and one of said N diode bridges and the other terminal connected to appropriate outputs of the others of said N diode bridges to provide said different predetermined values.

27. A power supply according to claim 26, wherein said feedback means includes
   a resistive voltage divider coupled between said common point and a reference voltage, and
   an amplifier means having a negative input, a positive input and an output, said output being coupled to said second means and said positive input being coupled to said voltage divider.

28. A power supply according to claim 27, wherein said current transformer means includes
   a current transformer having a primary winding inductively coupled to said N capacitors adjacent said common point and a second winding coupled to said primary winding, and
   a resistor coupled across said secondary winding and disposed between said voltage divider and said reference voltage, the junction between said resistor and said reference potential being coupled to said negative input of said amplifier means.

29. A power supply according to claim 28, wherein said current transformer means further includes
   a capacitor coupled in parallel with said resistor to provide noise decoupling.

30. A power supply according to claim 27, wherein said current transformer means includes
   a current transformer having a primary winding coupling said N capacitors to said common point and a secondary winding coupled to said primary winding having one terminal coupled to ground potential and the other terminal coupled to said negative input of said amplifier means, and
   a resistor coupled between said other terminal and said ground potential.

31. A power supply according to claim 30, wherein said current transformer means further includes
   a capacitor coupled in parallel with said resistor to provide noise decoupling.

32. A power supply according to claim 27, wherein said amplifier means includes
   a first capacitor and a first resistor connected in a series relationshp between said output of said amplifier means and ground potential.

33. A power supply according to claim 32, wherein said current transformer means includes
   a current transformer having a primary winding coupling said N capacitors to said common point and a secondary winding coupled to said primary winding having one terminal coupled to ground potential and the other terminal coupled to said negative input of said amplifier means, and
   a second resistor coupled between said other terminal and said ground potential.

34. A power supply according to claim 33, wherein said current transformer means further includes
   a second capacitor coupled in parallel with said second resistor to provide noise decoupling.

35. A power supply according to claim 32, wherein said current transformer means includes
   a current transformer having a primary winding inductively coupled to said N capacitors adjacent said common point and a second winding coupled to said primary winding, and
   a second resistor coupled across said secondary winding and disposed between said voltage divider and said reference voltage, the junction between said second resistor and said reference potential being coupled to said negative input of said amplifier means.

36. A power supply according to claim 35, wherein said current transformer means further includes
   a second capacitor coupled in parallel with said second resistor to provide noise decoupling.

37. A power supply according to claim 1, wherein said feedback means includes
   a resistive voltage divider coupled between said third means and a reference voltage, and
   an amplifier means having a negative input, a positive input and an output, said output being coupled to said second means and said positive input being coupled to said voltage divider.

38. A power supply according to claim 37, wherein said current transformer means includes
   a current transformer having a primary winding inductively coupled to said third means and a second winding coupled to said primary winding, and
   a resistor coupled across said secondary winding and disposed between said voltage divider and said reference voltage, the junction between said resistor and said reference potential being coupled to said negative input of said amplifier means.

39. A power supply according to claim 38, wherein said current transformer means further includes
   a capacitor coupled in parallel with said resistor to provide noise decoupling.

40. A power supply according to claim 37, wherein said current transformer means includes
   a current transformer having a primary winding coupled to said third means and a secondary winding coupled to said primary winding having one terminal coupled to ground potential and the other terminal coupled to said negative input of said amplifier means, and
   a resistor coupled between said other terminal and said ground potential.

41. A power supply according to claim 40, wherein said current transformer means further includes
   a capacitor coupled in parallel with said resistor to provide noise decoupling.

42. A power supply according to claim 37, wherein said amplifier means includes
   a first capacitor and a first resistor connected in a series relationship between said output of said amplifier means and ground potential.

43. A power supply according to claim 42, wherein said current transformer means includes a current transformer having a primary winding coupled to said third means and a secondary winding coupled to said primary winding having one terminal coupled to ground potential and the other terminal coupled to said negative input of said amplifier means, and a second resistor coupled between said other terminal and said ground potential.

44. A power supply according to claim 43, wherein said current transformer means further includes a second capacitor coupled in parallel with said second resistor to provide noise decoupling.

45. A power supply according to claim 42, wherein said current transformer means includes a current transformer having a primary winding inductively coupled to said third means and a second winding coupled to said primary winding, and a second resistor coupled across said secondary winding and disposed between said voltage divider and said reference voltage, the junction between said second resistor and said reference potential being coupled to said negative input of said amplifier means.

46. A power supply according to claim 45, wherein said current transformer means further includes a second capacitor coupled in parallel with said second resistor to provide noise decoupling.

* * * * *